United States Patent
Chitty

[15] 3,647,157
[45] Mar. 7, 1972

[54] MOTION PICTURE PROJECTOR EXCESS ROTATIONAL SPEED DETECTOR

[72] Inventor: Michael W. Chitty, New York, N.Y.
[73] Assignee: Century Projector Corporation, New York, N.Y.
[22] Filed: May 13, 1970
[21] Appl. No.: 36,868

[52] U.S. Cl. .......................... 242/191, 242/205, 352/180
[51] Int. Cl. ............... B65h 59/38, G03b 1/02, G11b 15/13
[58] Field of Search ........................... 242/186–191, 205; 352/166, 174, 180

[56] References Cited

UNITED STATES PATENTS

| | | | |
|---|---|---|---|
| 3,244,954 | 4/1966 | Branco | 318/7 |
| 3,497,158 | 2/1970 | Calaway | 242/190 |
| 3,552,842 | 1/1971 | Taillon | 352/125 |

Primary Examiner—Leonard D. Christian
Attorney—Gustave Miller

[57] ABSTRACT

The invention is an electronic system which senses the rotational speed of the takeup reel of a motion picture projector during operation. If the speed is higher than normal due to breakage, absence of or end of film, the device operates to shut down the projector and/or provide an audible or visible warning.

9 Claims, 4 Drawing Figures

INVENTOR
Michael W. Chitty

BY Justavi Miller

ATTORNEY

INVENTOR
Michael W. Chitty

MOTION PICTURE PROJECTOR EXCESS ROTATIONAL SPEED DETECTOR

The invention in its broadest aspects, relates to an electronic device for sensing whether the speed of rotating shaft has increased beyond a predetermined limit and providing an indication of such occurrence. In its more specific aspects, the sensing device is utilized for detecting when the speed of the takeup reel of a motion picture projector increases beyond a predetermined value and controlling means for discontinuing its operation.

It is advantageous, in operating motion picture projectors, to make provision for automatically discontinuing the operation of the projector, as by cutting off power to the arc lamp and film driving mechanism after the film has passed through the projector and to also effect such operations in the film should break or if an attempt is made to operate the projector without a film or with a film which has not been properly threaded therein. Although this may be accomplished by mechanically contacting the film with a feeler for sensing the tension or presence of the film at some location on the projector in order to operate a switch, if any one of the above abnormal conditions exists, there are certain inherent disadvantages in utilizing such a mechanical arrangement. Some of the disadvantages are that anything contacting the film provides a drag thereon, is liable to injure the film and provides the possibility of false signals if the film should temporarily become unsteady in its movement.

In the normal operation of a motion picture projector, the film is fed from the supply reel to take up reel at a constant linear speed. The driving mechanism for the film also drives the takeup reel, usually through a slip connection at a higher lineal speed than the film in order to wind the film onto the reel under some degree of tension. If no film is being fed to the takeup reel for any of the reasons enumerated above, the latter will rotate faster than when it is winding up the film normally fed thereto by the drive mechanism. The present invention makes use of this inherent operational characteristic of the projector to detect if an abnormal condition exists, to cause the power thereto to be shut off immediately and/or to produce a warning signal or to effect any other desired operation.

In order to carry out the invention for effecting the desired result, a shutter member located between a light source and a photosensitive device is rotated in synchronism with the takeup reel of the projector. An opening in the shutter permits recurrent illumination of the photosensitive device which controls a circuit for charging and discharging a storage device. A second photosensitive device subjected to illumination by the light source, through a second opening in the shutter, samples the voltage of the storage device which varies with time, to control the operation of a relay if the stored voltage is above a predetermined amplitude. The relay operates to discontinue the operation of the projector, produce a warning signal, turn on the room lights or another projector, if so desired.

It is therefore an object of this invention to effect the operation of a control mechanism when the rotation of a shaft exceeds a predetermined speed.

It is a further object of the invention to electronically detect an abnormal operation of a motion picture projector by sensing an excessive speed of the takeup reel above normal.

It is another object of the invention to discontinue the operation of a motion picture projector upon breakage or end of film by electronic sensing means and without physical contact with the film.

With these objects in view, others will become apparent as the description of the invention proceeds with reference to the drawings in which.

Figure 2:
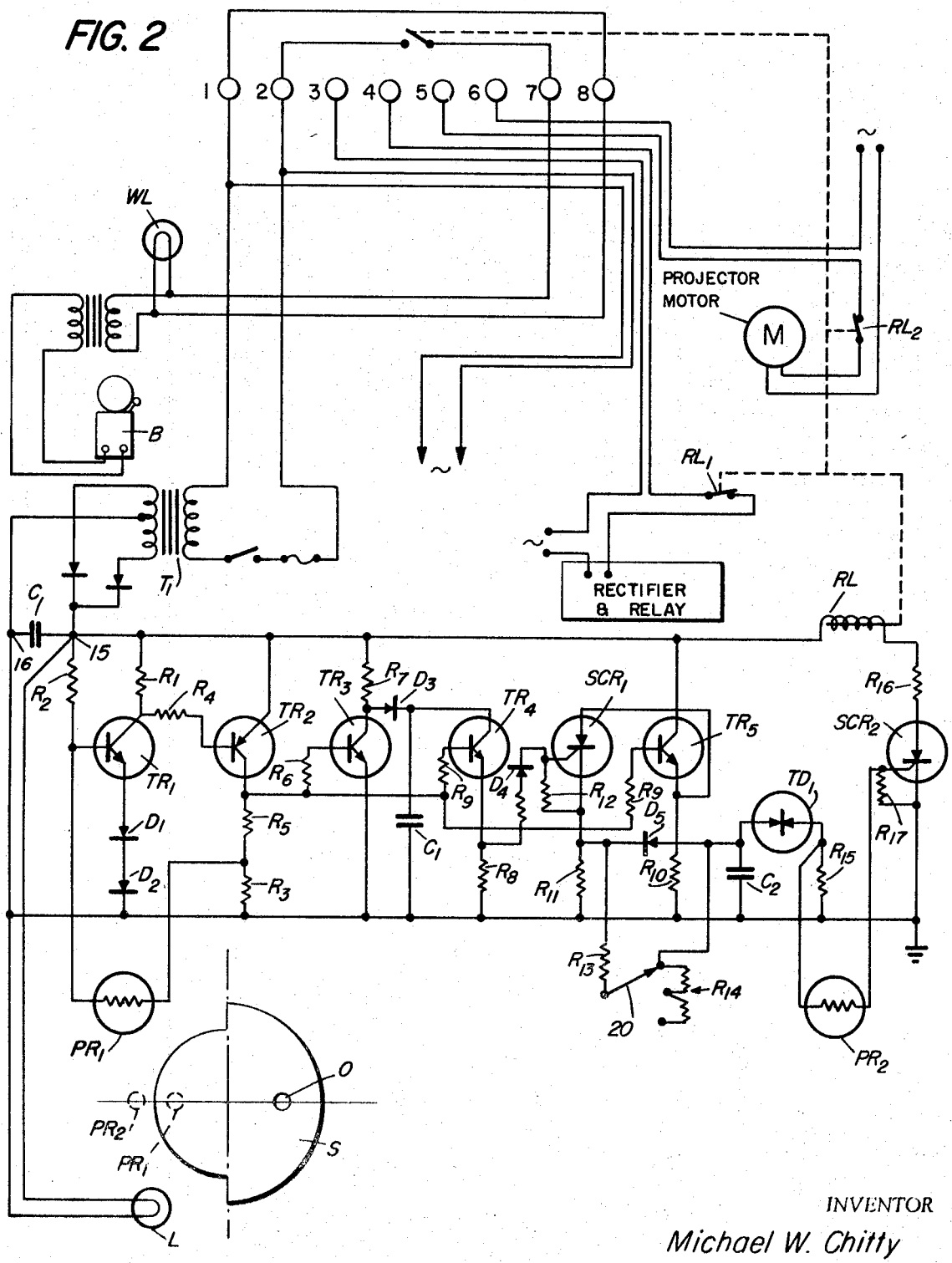
FIG. 2 is a schematic of the circuit utilized in carrying out the objects of the invention.

The projector P, which is conventionally provided with a projecting and focusing lens F, is also provided with supply and takeup reels, not shown, for the film. The supply reel is mounted on the opposite side of the plate 4 for rotation with a shaft 5. On the plate 4 is mounted the control box 6 which houses the elements of the invention including the circuit shown in FIG. 2, the rotating shutter S, the two photoresistive devices $PR_1$ and $PR_2$ and the light source L. The shutter S is mounted on a rotatable shaft 7 which protrudes from the control box and is provided with a pulley 12 which is driven by the shaft 5 rotating with the takeup reel by a belt B and pulley 14. For purposes of simplification, the diameters of the pulleys are made equal. The shutter S is opaque and has a 180° sector $S_1$ of one radius and a second 180° sector $S_2$ of a larger radius. Mounted in the control box 6 on one side of the shutter S is the pair of photoresistive $PR_1$ and $PR_2$ which are spaced from each other along a radius from the center of the shaft 7. An opening O is provided in the shutter S which is at the same distance from the center of shaft 7 as photoresistive element $PR_1$ is, and on a line normal to the diametral line of sector $S_2$. The photoresistive device $PR_2$ is so located radially of shaft 7, that it is shielded from light L on the opposite side of the shutter by sector $S_2$ but not by sector $S_1$.

The circuit which is controlled by rotation of the shutter during operation of the projector to detect an undesired increase of speed of the takeup reel, with now be described in detail. Normal power, such as 117 v. AC is applied to the terminals of the primary of the transformer $T_1$, the secondary os which is conventionally connected to a full-wave rectifier, the rectified output being connected across a condenser C and also across a pair of power input terminals 15 and 16 for energizing a transistorized circuit. The terminal 15 is positive and terminal 16 is negative and may be grounded the voltage thereacross being approximately 20 v. The circuit includes a NPN transistor $TR_1$ having its emitter grounded through a pair of series connected diodes $D_1$, $D_2$ connected in the forward direction and its collector connected to terminal 15 through a resistance $R_1$. A series circuit connected across the power input terminals 15, 16 is provided by resistance $R_2$, photoresistive element $PR_1$ and resistance $R_3$. When dark, photoresistive elements $PR_1$ and $PR_2$ have a high resistance, which decreases when they are illuminated. The base of $TR_1$ is connected to the junction of resistance $R_2$ and $PR_1$ of the series circuit. A PNP transistor $TR_2$ has its base electrode connected to the collector of $TR_1$ through a resistance $R_4$, its emitter connected to the positive terminal 15 and its collector connected through a resistance $R_5$ to the junction of resistance $R_5$ and photosensitive device $PR_1$. The values of the resistances so far described and the voltage at terminals 15 and 16 is such that with $PR_1$ illuminated so that its resistance is low, the base of transistor $TR_1$ is sufficiently negative to render it nonconductive to in turn cut off transistor $TR_2$. However, when $PR_1$ is dark, the dark resistance is high enough to decrease the current flow through the series combination of $R_2$, $PR_1$ and $R_3$ to render the base of $TR_1$ sufficiently positive to cause it to normally conduct. As connected, $TR_2$ will also become conductive.

Connected to the collector electrode of $TR_2$ through a resistance $R_6$ is the base of NPN transistor $TR_3$ having a grounded emitter and its collector connected to the positive terminal 15 through a resistance $R_7$. A diode $D_3$ connected in a forward direction, connects the collector electrode of $TR_3$ to one side of a storage condenser $C_1$, the other side of which is grounded. A NPN transistor $TR_4$ has its collector electrode connected to the junction of the condenser $C_1$ and diode $D_3$, its emitter connected to the ground through a resistance $R_8$ and its base connected through a resistance $R_9$ to the collector of $TR_2$. A further NPN transistor $TR_5$ is controlled by the transistor $TR_2$ by having its base electrode connected to the collector of $TR_2$, through a resistance $R_9$. The collector of $TR_5$ is connected to the positive terminal 15 and its emitter to ground through a resistance $R_{10}$. A silicon-controlled-rectifier $SCR_1$ has its anode connected to the emitter electrode of transistor TR$_5$ and its cathode connected to ground through a resistance R$_{11}$. The gate electrode of SCR$_1$ is connected to the cathode of a diode D$_4$, the anode of which is connected to the emitter of TR$_4$. A resistance R$_{12}$ connects the gate electrode of SCR$_1$ to its cathode electrode. Also connected to the cathode electrode of SCR$_1$ is one end of a resistance element R$_{13}$ the other end of which is connected to the movable arm 20 of a rheostat comprising a fixed resistance R$_{14}$ having a center tap, the ends of the fixed resistance and the center tap having contacts engageable by the arm 20 of the rheostat.

One end of the resistance R$_{14}$ is connected to one terminal of a storage condenser C$_2$ of approximately 10 mf. the other terminal of which grounded. The ungrounded terminal of the condenser is connected to one side of a solid state voltage controlled switch TD$_1$, the other side of which is connected to ground through a resistance R$_{15}$. The switch is of the type which holds off conduction until a predetermined voltage appears thereacross, which in this case is approximately 8 volts, after which it breaks down and continues to conduct until the voltage thereacross decreases to a predetermined low value. A diode D$_5$ is connected between the ungrounded terminals of condenser C$_2$ and resistance R$_{11}$ to allow the condenser to discharge over a long period of time when the switch TD$_1$ is nonconductive. A relay winding RL is connected in series with a current limiting resistance R$_{16}$ in the anode-cathode path of a second silicon-controlled-rectifier SCR$_2$ connected across the power input terminals 15, 16. A resistance R$_{17}$ connects the gate electrode of SCR$_2$ to its cathode electrode. The gate electrode is connected to receive a voltage which appears on the ungrounded end of resistor R$_{15}$ through the photoresistor PR$_2$ when the latter is illuminated. SCR$_2$ will conduct when the voltage on the gate electrode is over 3 volts. When the photoresistor is dark, its resistance is high and insufficient voltage will be applied to the gate electrode of SCR$_2$ to trigger it into conduction.

Figure 1:
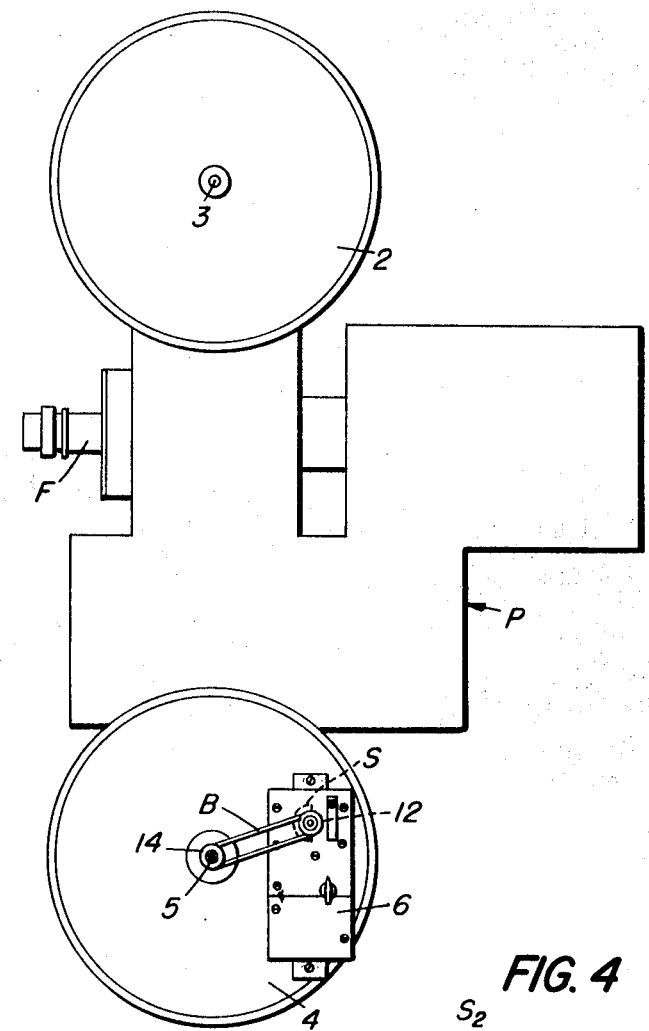
FIG. 1 is a view of a side of the projector showing the control device of the invention mounted thereon.
Figure 3:
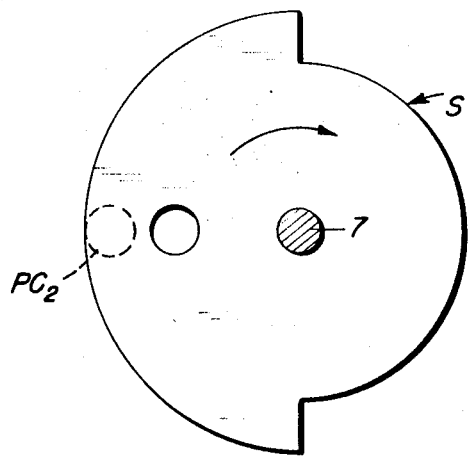
FIGS. 3 and 4 are detail views which show the rotatable disc or shutter in two different positions respectively, relative to the photoresistive devices which it controls.
Figure 4:
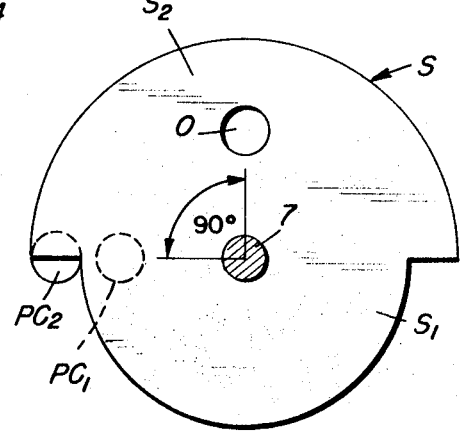

The operation of the circuit so far described is as follows: Assuming that the disc or shutter is rotating slowly during normal operation of the projector, when opening O comes into line with the light source L and photoconductive cell PR$_1$ as in FIG. 3, the resistance of PR$_1$ deceases. The trigger circuit, comprising transistors TR$_1$ and TR$_2$ which were previously conductive as described above, are now cut off and the voltage at the collector electrode of TR$_2$ drops from the source voltage of about 20 volts, to 0. As a result, TR$_3$ cuts off since its base electrode is now at a negative potential. The condenser C$_1$ now charges toward the source voltage through resistor R$_7$ and diode D$_3$. Transistors TR$_4$ and TR$_5$ are also cut off due to the drop in the potential at the collector electrode of transistor TR$_2$. The silicon controlled rectifier SCR$_1$ now resets, since its anode voltage has been disconnected due to cut off of transistor TR$_5$. As the rotating disc S advances from the position shown in FIG. 3 toward that in FIG. 4, the light is suddenly cut off from cell PR$_1$ so that the resistance of the latter increases, whereby both transistors TR$_1$ and TR$_2$ become conductive as previously explained. The voltage at the collector of TR$_2$ at this time is the source voltage, about 20 volts, and transistor TR$_3$ therefore conducts since its base electrode is sufficiently positive relative to its emitter electrode. The base of transistor TR$_4$ being at the supply voltage of about 20 volts, the transistor will become conductive since its collector electrode is connected to condenser C$_1$ which has been previously full charged, as described above. Such conduction of transistor TR$_4$ operates to apply a positive potential to the gate electrode of SCR$_1$ in order to trigger it into conduction. The anode of SCR$_1$ is at the source potential of approximately 20 volts since it is connected to the emitter of TR$_5$, the latter being conductive by reason of its base electrode being biased positive relative to its emitter electrode. Due to conduction of both transistor TR$_5$ and SCR$_1$, the ungrounded end of condenser C$_2$ is connected to the source of positive potential through arm 20 of rheostate R$_{14}$ and resistance R$_{13}$ and therefore begins to charge toward the source voltage. The switch TD$_1$ connected to condenser C$_2$ becomes conductive however, as soon as the voltage thereacross reaches a value of about 8 volts. The condenser C$_2$ therefore, now discharges rapidly, producing a pulse of a value slightly less than 8 volts across the resistance R$_{15}$ and holds at a low voltage until SCR$_1$ is reset by cut off of transistor TR$_5$.

Since it has been assumed that the take up reel, and consequently the shutter S, is rotating at its normal slower speed, the sector S$_2$ will expose cell PR$_2$ to the light from the lamp after the condenser C$_2$ has discharged to a value below about 3 volts. Therefore, SCR$_2$ will not be triggerred into conduction at this time, since as explained above, the voltage on the gate electrode thereof must exceed 3 volts to render it conductive. The winding of relay RL not being energized, relay contacts RL$_1$ and RL$_2$ remain in their normally closed positions whereby the motor M of the projector continues to run and the rectifier-relay for operating the arc lamp remains energized. The relay contact RL$_3$ remains normally open to disconnect the warning light WL and bell from their energizing source. Should the takeup reel suddenly increase its rotational speed due to breakage of the film being fed thereto, for example, the speed of shaft 5 of the takeup reel will suddenly increase as described above. Therefore, the time elapsing between the successive exposures of elements PR$_1$ and PR$_2$ to the light from source L becomes shorter than the time necessary to charge condenser C$_2$ and then discharge it to a value below about three volts which is the triggering voltage of the controlled rectifier SCR$_2$. When the latter becomes conductive, current flows through the winding of relay RL causing normally closed contacts RL$_1$ and RL$_2$ to open, thus cutting off power to the projector arc lamp and film driving motor. Normally open switch contacts RL$_3$ are closed to cause energization of warning light WL and audible signal B. If desired of the operations can be effected, such as turning on the theater lights or initiating the operation of a second projector. The charging time of the condenser C$_2$ can be varied by moving the contact arm 20 to insert more or less of the resistance R$_{14}$ into the charging circuit for adjusting the sensitivity of the system to respond to an increase in the speed of the takeup reel.

It is, of course, understood that, although the invention has been described as being used with motion picture projectors, it is not limited to this application. The device as described can be used to sense relatively small increases in speed above "normal" settings within less than one revolution of the shutter. Assuming that the normal shutter speed is 60 r.p.m., the power can be cut off in one second or less. At normal shutter speeds of 120 r.p.m., the power could be shut off in one-half second. In the case of a motion picture projector which operates at film speeds of 90 feet per minute, the power could be shut off within the time taken to feed 1.5 feet of film following a film break at full speed. Variation of this device can also be used to sense decreases in speed below normal settings with slight variations in the sensing circuit.

Having thus described the invention with the particularity required by the statutes and the best mode of making and operating same, it is deemed that obvious changes which would occur to others skilled in the art fall within the scope of this invention as defined by the following claims.

What is claimed is:

1. In a motion picture projector having a film supply reel, a takeup reel and driving means for rotating the takeup reel at a speed within a predetermined range of speeds when feeding film thereto, and at a higher speed than within the range when no film is being fed thereto during operation of the driving means,
  means for detecting rotation of the takeup reel at the higher speed comprising,
  timing means operative for a predetermined time interval representative of the highest speed within the range,
  means cyclically operative at a speed proportionate to that of the takeup reel for recurringly initiating, at a predetermined point in each cycle, operation of the timing means,
  and means including a relay, responsive to the timing means only during said interval, and rendered operative by the cyclically operating means at a later point in the cycle, for providing an indication of the higher speed.

2. In a motion picture projector according to claim 1 in which the relay also renders the driving means inoperative.

3. In a motion picture projector in accordance with claim 1 in which said timing means comprises an electric circuit and the cyclically operative means includes a light source, a photosensitive device connected to the circuit for initiating its operation for the predetermined time interval when illuminated by the light source, and a rotatable shutter between the light source and photosensitive device having means at a predetermined location thereon for directing the light from the source to the photosensitive device, said location being at the predetermined point in each cycle.

4. In a motion picture projector according to claim 3 in which the means rendered operative by the timing means only during the interval includes a second photosensitive device, the shutter having means at a second location thereon for directing light to the second photosensitive device the second location being at said later point in the cycle.

5. In a motion picture projector according to claim 1 in which the timing means comprises an electric circuit having a storage element, and means for effectively discharging the element during said interval, the circuit being responsive to the cyclic means at said predetermined point in the cycle for charging the storage element.

6. A shaft speed sensing system comprising, a circuit operative for charging a condenser to a predetermined high value and for then discharging it to a predetermined low value within a period of time related to the normal rotational speed of the shaft, first means movable in timed relation with the shaft for initiating operation of the circuit, means responsive to a voltage above the predetermined low value for providing an indication, connection means for applying the condenser discharge voltage to the voltage responsive means, and second means movable with said first means for operating the connection means after the first means initiates operation of the circuit.

7. A shaft speed sensing device in accordance with claim 6 including means for varying the circuit constants to vary the period of time for charging and discharging the condenser to the predetermined voltage amplitudes.

8. A shaft speed sensing device according to claim 6 in which the electric circuit includes a photoresistive element and the first means includes an opaque shutter having an opening therein for passing light rays to the element.

9. A shaft speed sensing device according to claim 8 in which the connection means includes a second photoresistive element and the second means includes a further opening in the shutter spaced from the first opening therein.

* * * * *